US011967111B2

United States Patent
Seo et al.

(10) Patent No.: US 11,967,111 B2
(45) Date of Patent: Apr. 23, 2024

(54) MULTI-VIEW CAMERA-BASED ITERATIVE CALIBRATION METHOD FOR GENERATION OF 3D VOLUME MODEL

(71) Applicant: KWANGWOON UNIVERSITY INDUSTRY—ACADEMIC COLLABORATION FOUNDATION, Seoul (KR)

(72) Inventors: Young Ho Seo, Seoul (KR); Byung Seo Park, Cheongju-si (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 449 days.

(21) Appl. No.: 17/332,618

(22) Filed: May 27, 2021

(65) Prior Publication Data

US 2022/0189062 A1 Jun. 16, 2022

(30) Foreign Application Priority Data

Dec. 15, 2020 (KR) .......................... 10-2020-0174948
May 3, 2021 (KR) .......................... 10-2021-0057081

(51) Int. Cl.
*G06T 7/80* (2017.01)
*G06T 15/20* (2011.01)

(52) U.S. Cl.
CPC ................ *G06T 7/80* (2017.01); *G06T 15/20* (2013.01); *G06T 2207/10024* (2013.01); *G06T 2207/10028* (2013.01)

(58) Field of Classification Search
CPC . G06T 7/80; G06T 15/20; G06T 2207/10024; G06T 2207/10028
See application file for complete search history.

(56) References Cited

U.S. PATENT DOCUMENTS 9,369,696 B2 * 6/2016 Lee ........................... G06T 7/85
10,839,557 B1 * 11/2020 Arora .................... G06T 19/006
11,410,395 B2 * 8/2022 Velasquez ............. G06T 19/006
(Continued)

OTHER PUBLICATIONS

Filippo Basso et al., "Robust Intrinsic and Extrinsic Calibration of RGB-D Cameras", IEEE Transactions on Robotics, Oct. 2018, pp. 1315-1332, vol. 34, No. 5.
(Continued)

*Primary Examiner* — Utpal D Shah
(74) *Attorney, Agent, or Firm* — NKL LAW; Jae Youn Kim

(57) ABSTRACT

Proposed is a multi-view camera-based iterative calibration method for generation of a 3D volumetric model that performs calibration between cameras adjacent in a vertical direction for a plurality of frames, performs calibration while rotating with the results of viewpoints adjacent in the horizontal direction, and creates a virtual viewpoint between each camera pair to repeat calibration. Thus, images of various viewpoints are obtained using a plurality of low-cost commercial color-depth (RGB-D) cameras. By acquiring and performing the calibration of these images at various viewpoints, it is possible to increase the accuracy of calibration, and through this, it is possible to generate a high-quality real-life graphics volumetric model.

12 Claims, 7 Drawing Sheets

(56) References Cited

U.S. PATENT DOCUMENTS

| | | | |
|---|---|---|---|
| 2011/0299761 A1* | 12/2011 | Myokan | G06T 7/85 |
| | | | 382/154 |
| 2012/0194652 A1* | 8/2012 | Myokan | G06T 7/85 |
| | | | 348/E13.074 |
| 2018/0053309 A1* | 2/2018 | Maani | G06T 7/251 |
| 2019/0164346 A1* | 5/2019 | Kim | G06T 15/005 |
| 2020/0150275 A1* | 5/2020 | Zhu | G06T 19/20 |
| 2021/0023694 A1* | 1/2021 | Chen | B25J 9/0081 |
| 2021/0294328 A1* | 9/2021 | Dhayalkar | G05D 1/027 |
| 2022/0138896 A1* | 5/2022 | Hou | G06T 3/0068 |
| | | | 382/100 |
| 2022/0276360 A1* | 9/2022 | Ma | G01S 13/867 |
| 2023/0083150 A1* | 3/2023 | Gaarde | G06T 19/20 |
| | | | 348/46 |

OTHER PUBLICATIONS

Guangda Chen et al, "Accurate Intrinsic and Extrinsic Calibration of RGB-D Cameras With GP-Based Depth Correction", IEEE Sensors Journal, Apr. 1, 2019, pp. 2685-2694, vol. 19, No. 7.

* cited by examiner

MULTI-VIEW CAMERA-BASED ITERATIVE CALIBRATION METHOD FOR GENERATION OF 3D VOLUME MODEL

CROSS-REFERENCE TO RELATED APPLICATIONS

This application claims priority to and the benefit of Korean Patent Application No. 10-2020-0174948, filed on Dec. 15, 2020 and Korean Patent Application 10-2021-0057081, filed on May 3, 2021, the disclosures of which are incorporated herein by references in their entireties.

BACKGROUND OF THE INVENTION

1. Field of the Invention

The present invention relates to a multi-view camera-based iterative calibration method for generation of a 3D volumetric model that matches images of each camera in order to generate a high-quality realistic graphics volumetric model using a plurality of inexpensive commercial color-depth (RGB-D) cameras distributed in a limited space.

In addition, the present invention relates to a multi-view camera-based iterative calibration method for generation of a 3D volumetric model that performs calibration between cameras adjacent in a vertical direction for a plurality of frames, performs calibration while rotating with the results of viewpoints adjacent in the horizontal direction, and creates a virtual viewpoint between each camera pair to repeat calibration.

2. Description of the Related Art

In general, in virtual reality (VR), augmented reality (AR), mixed reality (MR), and extended reality (XR) technology in which 3D graphics technology and realistic technology are mixed, it is very important to accurately extract an actual object. In order to obtain a realistic object, only a plurality of RGB cameras may be used, or a sensor that directly obtains depth information may be used. Although a scheme of obtaining information is very efficient, because the depth sensor performance is not yet complete, a lot of research is required to compensate for it.

Since the Microsoft research team published KinectFusion [Non-Patent Document 1] in 2011, research on generating an omnidirectional 3D model using several inexpensive commercial RGB-D cameras has been actively conducted [Non-Patent Document 2]. Prior to generating a 3D model using multiple RGB-D cameras, a process of integrating point clouds of objects acquired from each camera into a single coordinate system is required [Non-Patent Document 2]. This process is called point cloud matching.

The most well-known point cloud matching algorithm is the iterative closest point (ICP) algorithm. The ICP is a scheme of finding a pair of points at the closest distance to a predefined overlapping area between two input point sets, and obtaining a coordinate transformation parameter that minimizes their distance through repetitive operations. As a similar manner to ICP, a SoftAssign algorithm that performs matching through repetitive operation of a point set and various transformation algorithms based on it have been studied. Such studies depend a lot on the initial values of parameters and the size of the overlapping area between point clouds, and have a disadvantage of local minima.

As other matching schemes using point sets, schemes such as principal component analysis (PCA) alignment, modal, and spectral matching using specific geometric characteristics have been studied. Since such schemes also depend on how the point set is structured, it is difficult to apply in a system where the depth value obtained from the RGB-D camera is noisy and the overlapping area between cameras is small.

The coordinates of each camera must be transformed for point cloud matching. Various schemes have been studied to obtain a coordinate transformation matrix for point cloud matching. The Zhang algorithm is a commonly used scheme of extracting a coordinate transformation matrix. The Zhang algorithm does not depend on a point set, and uses a chess board or the like that is easy to extract feature points. However, since the Zhang scheme estimates internal and external parameters based on a pinhole camera model, an error inevitably occurs when applied to an actual camera. In addition, since the Zhang scheme is a scheme of obtaining a coordinate transformation matrix based on camera position estimation using an RGB camera rather than a depth camera, the Zhang scheme cannot be used to directly transform 3D shape information acquired based on the coordinate system of the depth camera.

In order to overcome the problem that the point cloud matching result depends on the initial parameters and point set configuration, such as the ICP algorithm, and the problem that the coordinate transformation matrix obtained from the camera attitude estimation method using RGB images has a large error, there has been studied an algorithm that finds an optimized coordinate transformation parameter through repetitive operations using points located in the same space among the point clouds acquired from each camera by calculating the initial parameters in the RGB image.

(Non-Patent Document 1) F. Basso, E. Menegatti and A. Pretto, "Robust Intrinsic and Extrinsic Calibration of RGB-D Cameras," in IEEE Transactions on Robotics, vol. 34, no. 5, pp. 1315-1332, October 2018, doi: 10.1109/TRO.2018.2853742.

(Non-Patent Document 2) G. Chen, G. Cui, Z. Jin, F. Wu and X. Chen, "Accurate Intrinsic and Extrinsic Calibration of RGB-D Cameras With GP-Based Depth Correction," in IEEE Sensors Journal, vol. 19, no. 7, pp. 2685-2694, 1 Apr. 1, 2019, doi: 10.1109/JSEN.2018.2889805.

SUMMARY OF THE INVENTION

To solve the above-described problems, an object of the present invention is to provide a multi-view camera-based iterative calibration method for generation of a 3D volumetric model that matches images of each camera in order to generate a high-quality realistic graphics volumetric model using a plurality of inexpensive commercial color-depth (RGB-D) cameras distributed in a limited space.

In addition, another object of the present invention is to provide a multi-view camera-based iterative calibration method for generation of a 3D volumetric model that performs calibration between cameras adjacent in a vertical direction for a plurality of frames, performs calibration while rotating with the results of viewpoints adjacent in the horizontal direction, and creates a virtual viewpoint between each camera pair to repeat calibration.

Still another object of the present invention is to provide a multi-view camera-based iterative calibration method for generation of a 3D volumetric model that perform calibration using a scheme of minimizing an error function between 3D coordinates of a feature point obtained from color (RGB) images of two cameras, and terminates the calibration when an extrinsic parameter for converging error values is obtained.

To achieve the objects, according to one aspect of the present invention, a multi-view camera-based iterative calibration method for generation of 3D volumetric model includes (a) receiving a multi-view color-depth image (sample image); (b) converting each sample image into a point cloud (point cloud of each viewpoint); (c) optimizing a transformation parameter by performing calibration (top-bottom calibration) for point clouds of viewpoints adjacent in a vertical direction (top-bottom point clouds), and matching the top-bottom point clouds; (d) optimizing the transformation parameter by performing calibration (round calibration) for top-bottom matched point clouds of viewpoints adjacent in a horizontal direction; and (e) generating a point cloud of a virtual viewpoint by combining some of the top-bottom point clouds of at least two viewpoints, and optimizing the transformation parameter by performing calibration (viewpoint calibration) for a viewpoint adjacent to the virtual viewpoint.

In addition, in (a), the multi-view sample image includes color-depth images of each viewpoint captured by at least four color-depth cameras constituting at least two horizontal layers, and numbers of sample images in each layer are same.

In addition, in (c), the transformation parameters are optimized by performing calibration on point clouds of viewpoints adjacent in the vertical direction at each of all viewpoints in the horizontal direction, and a top-bottom matched point cloud is generated by matching and combining point clouds of viewpoints adjacent in the vertical direction with a coordinate system of one viewpoint (top-bottom reference coordinate system) among the viewpoints adjacent in the vertical direction, and among the adjacent viewpoints in each vertical direction, the viewpoint of the top-bottom reference coordinate system is set as the viewpoint of the same horizontal layer.

In addition, in (d), a transformation parameter is optimized for each of pairs of adjacent two top-bottom-matched point clouds, and a transformation parameter is optimized according to a top-bottom reference coordinate system of the top-bottom-matched point cloud.

In addition, in (e), the point cloud of the virtual viewpoint is generated by combining some of the top-bottom point clouds of two adjacent viewpoints of a corresponding viewpoint at each viewpoint in the horizontal direction when performing the virtual viewpoint calibration, and calibration is performed on each of the point cloud of the virtual viewpoint and the point clouds of two adjacent viewpoints of the virtual viewpoint.

In addition, in (d), top-bottom matched point clouds used for the round calibration are randomly extracted from a plurality of frames, and one of the top-bottom matched point clouds of consecutive frames of the sample image at each viewpoint are randomly extracted the top-bottom-matched point clouds of the corresponding viewpoint.

In addition, the multi-view camera-based iterative calibration method further includes (f) repeating (d) and (e) on the top-bottom matched point cloud of the frame that is randomly selected from the plurality of frames.

In addition, in (c), (d) and (e), when performing the top-bottom calibration, the round calibration, and the virtual viewpoint calibration, respectively, one of the two viewpoints is set as a reference coordinate system, and the transformation parameter includes a rotation transformation matrix, a translation matrix, and a scaling factor for the reference coordinate system.

In addition, when performing the top-bottom calibration, the round calibration, and the virtual viewpoint calibration, the transformation parameter is optimized to minimize an error between an actual coordinate ($X_{ref}$) of the point cloud of the reference coordinate system and a transformation coordinate ($X_i'$) by the transformation parameter.

In addition, the multi-view camera-based iterative calibration method further includes (g) repeating (c), (d), and (d), and ending the repeating by evaluating an error degree and variation of an optimization function of all calibrations.

In addition, in (g), when the error of the optimization function of all calibrations is within a predetermined range, and the variation leading to reduction of the error is less than a predetermined threshold variation when the repeating is additionally performed by a predetermined number of times, the ending is performed.

In addition, when performing the top-bottom calibration, the round calibration, and the virtual viewpoint calibration, the optimizing is repeated by updating a next coordinate transformation parameter $P_{n+1}$ from a current coordinate transformation parameter $P_n$ according to Equation 1, $$P_{n+1} = P_n - \alpha \frac{\partial f_{Error}}{\partial P_n} \quad \text{[Equation 1]}$$

wherein $\alpha$ is a preset constant, P represents a rotation transformation matrix R, a translation matrix t, and a scaling factor S of a transformation parameter, $P_n$ represents a value of a currently calculated transformation parameter, $P_{n+1}$ represents a coordinate transformation parameter value to be corrected, $\partial f_{Error}/\partial P_n$ represents partial differentiation of $f_{Error}$ by a transformation parameter, and $f_{Error}$ is an error function between an actual coordinates ($X_{ref}$) of a point cloud of a reference coordinate system and a transformation coordinate ($X_i'$) by a transformation parameter.

In addition, according to another aspect of the present invention, a computer-readable recording medium having a program recorded thereon to perform a multi-view camera-based iterative calibration method for generation of a 3D volumetric model.

As described above, according to the multi-view camera-based iterative calibration method for generating a three-dimensional volumetric model according to the present invention, images of various viewpoints are obtained using a plurality of low-cost commercial color-depth (RGB-D) cameras. By acquiring and performing the calibration of these images at various viewpoints, it is possible to increase the accuracy of calibration, and through this, it is possible to generate a high-quality real-life graphics volumetric model.

BRIEF DESCRIPTION OF THE DRAWINGS

FIG. 2A illustrates a shape viewed from above, and FIG. 2B illustrates the photographing angle and range in a side direction.

FIGS. 5A-5C are views illustrating a 3D charcoal board and a feature point according to an embodiment of the present invention, wherein FIG. 5A illustrates a charcoal board, FIG. 5B illustrates feature point coordinates of a 3D charcoal board, and FIG. 5C illustrates feature coordinates viewed from above.

DETAILED DESCRIPTION OF THE INVENTION

Figure 1:
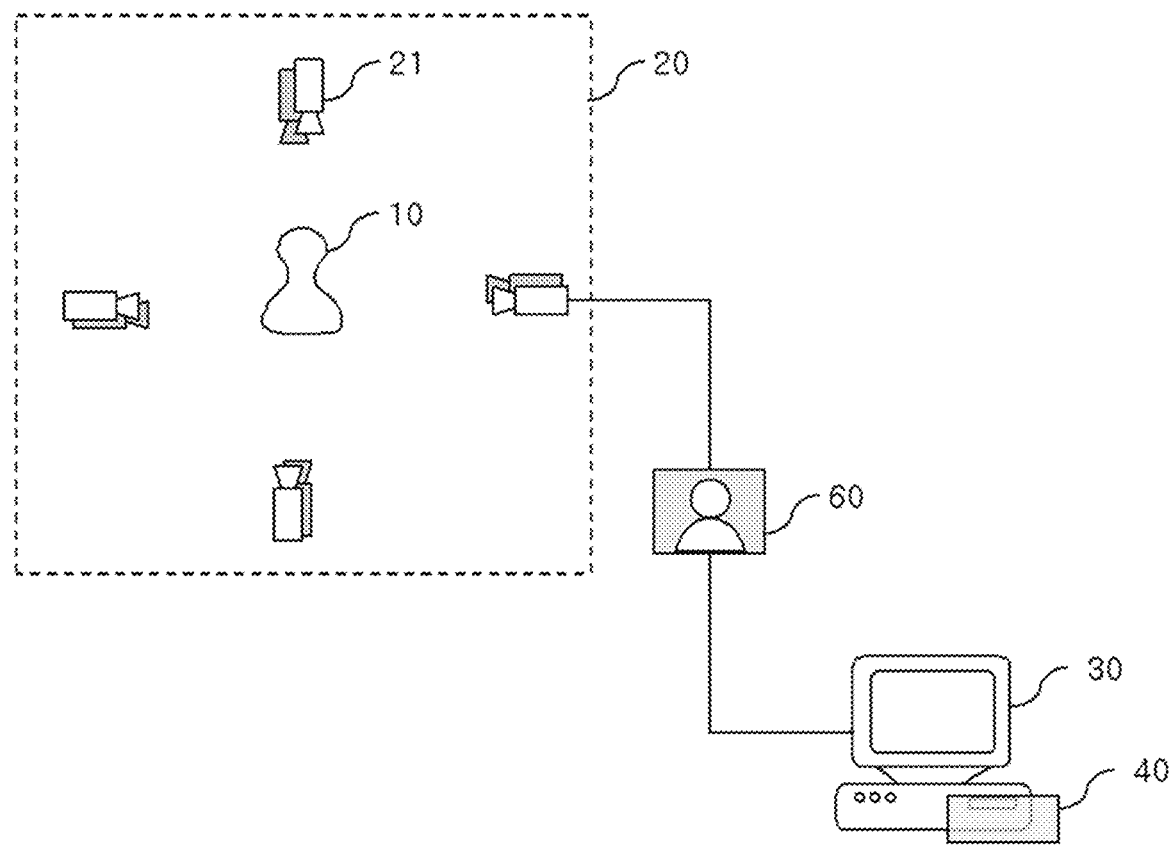
FIG. 1 is a view illustrating the configuration of an entire system for implementing the present invention.

Hereinafter, preferable embodiments of the present disclosure will be described in detail with reference to accompanying drawings.

The same reference numerals are used for the same components in the drawings, and duplicate descriptions of the same components are omitted.

First, examples of the configuration of an entire system for implementing the present invention will be described with reference to FIG. 1.

As shown in FIG. 1, a multi-view camera-based iterative calibration method for generating a three-dimensional (3D) volumetric model according to the present invention may be implemented with a program system on a computer terminal 30 that receives a multi-view depth and color (RGB, etc.) image captured by a distributed camera system 20 to match multi-view point clouds. That is, the calibration method for matching the point clouds may be installed and executed on a computer system 30 including a program. The program installed in the computer terminal 30 may operate as a single program system 40.

Meanwhile, as another embodiment, the calibration method may be implemented with a single electronic circuit such as an application-specific integrated circuit (ASIC), in addition to being configured as a program and operating on a general-purpose computer. Alternatively, the calibration method may be developed as a dedicated computer terminal 30 that exclusively processes only matching point clouds in a multi-view depth and color image. This will be referred to as a point cloud matching system 40. It may be embodied in other possible forms.

Meanwhile, the distributed camera system 20 includes a plurality of color-depth (RGB-D) cameras 21 that photograph an object 10 at different viewpoints.

In addition, each RGB-D camera 21 is a camera that obtains a color and depth image (or RGB-D image) by measuring color information and depth information. Preferably, the RGB-D camera 21 is a Kinect camera. The color and depth image is composed of 2D pixels through the RGB-D camera 21, and each pixel has a color value and a depth value.

The multi-view color-depth image 60 captured by the RGB-D camera 21 is directly input to the computer terminal 30 and stored, and processed by the point cloud matching system 40. Alternatively, the multi-view color-depth image 60 may be pre-stored in a storage medium of the computer terminal 30 and may be input by reading the color-depth image 60 stored by the point cloud matching system 40.

The image is composed of consecutive frames in time. For example, when the frame at the current time t is referred to as the current frame, the frame at the immediately preceding time t−1 is referred to as the previous frame, and the frame at t+1 is referred to as the next frame. Meanwhile, each frame has a color image and a depth image (or depth information).

In particular, the object is photographed at different viewpoints as many as the number of RGB-D cameras 21 and at a specific time t, the multi-view depth and color images 60 are obtained as many as the number of cameras.

Meanwhile, the color-depth image 60 is composed of consecutive frames in time. One frame has one image. In addition, the image 60 may have one frame (or image). That is, the image 60 is also applicable to a single image.

Matching a multi-view cloud point in a multi-view color-depth image means detection in each depth/color frame (or image), but unless there is a need for special distinction below, the terms of an image or image will be mixed.

Next, a configuration of a distributed camera system 20 according to an embodiment of the present invention will be described with reference to FIGS. 2A-2B.

The distributed camera network refers to a system in which a plurality of cameras is located at an arbitrary location in a certain space and an object is scanned.

In particular, in the distributed camera system 20, cameras facing an object from at least four points (view points) in a horizontal direction are installed, and at least two cameras spaced apart from each other are installed at each point (view point) in a vertical direction (up and down direction). That is, the distributed camera system 20 includes at least two horizontal layers, each of which has at least four cameras. Not all cameras need to be installed in exact locations, but may be installed in approximately similar locations.

As an example, a distributed camera network is constructed in such a manner that eight cameras are installed in a limited space to generate a realistic 3D volumetric model. The eight cameras face the center of the space, where four cameras are located at the bottom and the remaining four cameras are located at the top.

Figure 2A:
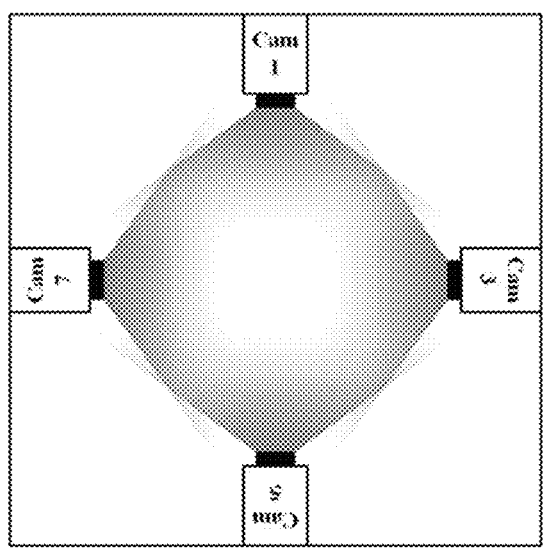
FIGS. 2A and 2B are views illustrating a configuration of a distributed camera system for scanning a realistic 3D volumetric model based on a point cloud according to an embodiment of the present invention, where
Figure 2B:
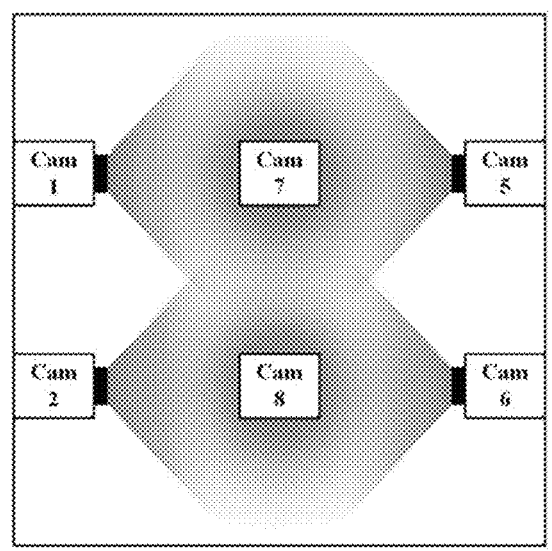

FIGS. 2A and 2B are views illustrating arrangements of a distributed camera network according to an embodiment of the present invention. FIG. 2A illustrates a shape viewed from above, and FIG. 2B illustrate an arrangement in a front direction.

The camera is placed in consideration of the type and performance of a color-depth (RGB-D) sensor and the size of an object to be scanned. The maximum quality and the number of frames scanned per second are dependent on the characteristics of the color-depth (RGB-D) sensor. In general, the type and number of RGB-D sensors will be determined according to the purpose of using the realistic 3D volumetric model finally obtained. Preferably, a color-depth (RGB-D) sensor using Kinect Azure, which is a relatively inexpensive time-of-flight (ToF) sensor, is used.

Next, the entire process for generating a realistic 3D volumetric model according to an embodiment of the present invention will be described with reference to FIG. 3.

Figure 3:
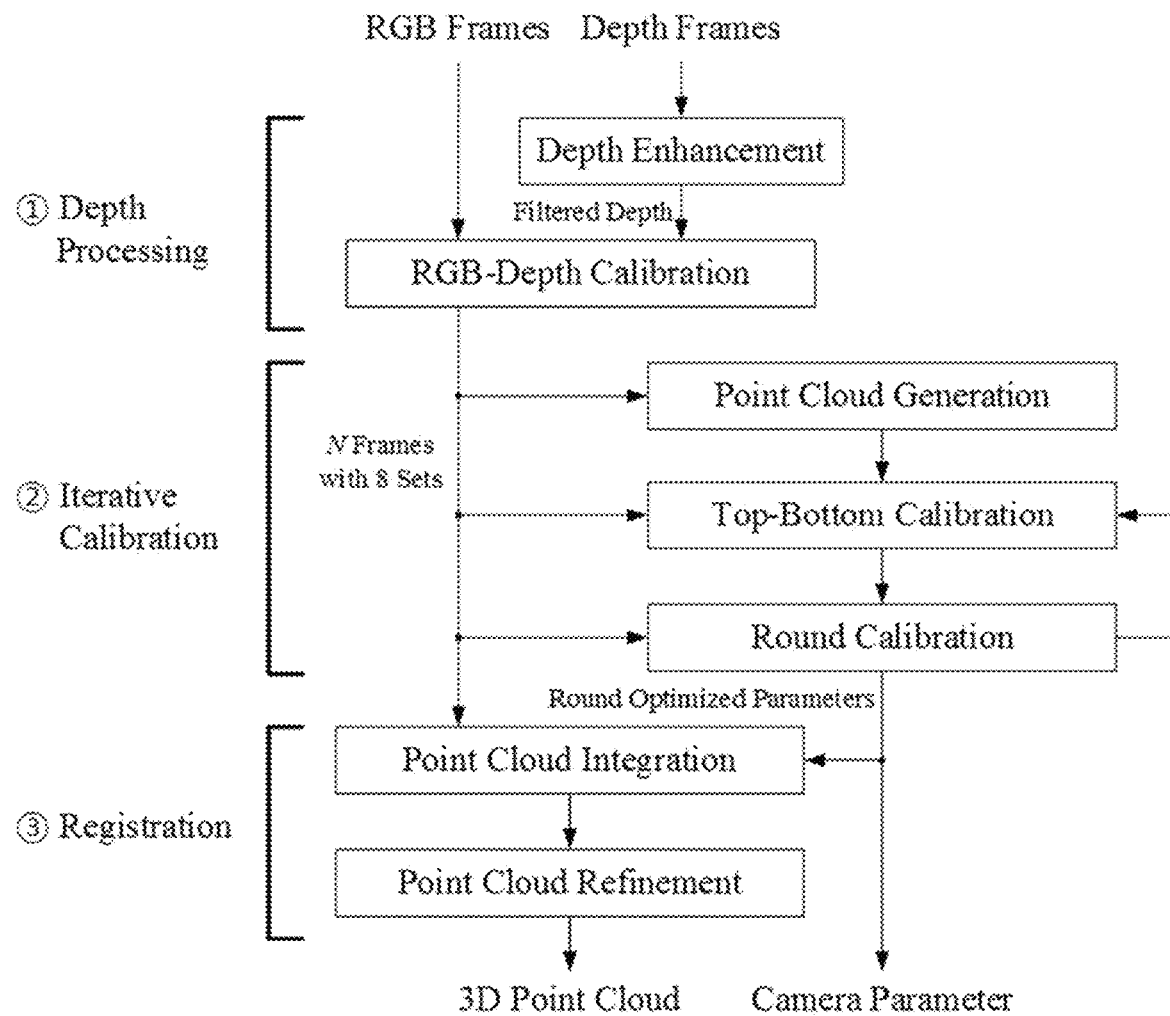
FIG. 3 is a flow chart illustrating the entire process for generating a realistic 3D volumetric model using a color-depth (RGB-D) distributed camera network according to an embodiment of the present invention.

As illustrated in FIG. 3, a method of generating a 3D point cloud according to an embodiment of the present invention includes a depth processing process ①, an iterative calibration process ②, and a registration process ③.

First, in the depth processing process ①, since the depth information sensed from an inexpensive commercial ToF sensor has many noise components, the noise component (deviation of the depth value over time) is removed. The depth information from which noise is removed for each camera is calibrated based on a color (RGB) image.

Next, the iterative calibration process ② is largely composed of two processes. A pair of cameras arranged above and below is formed to obtain external parameters between them. In addition, the external parameters of the cameras are calculated by predicting the locations of feature points between the four viewpoints. These two processes are repeated until optimal results are obtained.

Last, through the registration process ③, all point clouds are integrated using the obtained external parameters. That is, one integrated 3D point cloud is generated using the external parameters. In addition, in order to improve the quality, a process of improving a point cloud is performed. After all these processes, a realistic 3D point cloud is finally output.

Next, a multi-view camera-based iterative calibration method for generating a 3D volumetric model according to an embodiment of the present invention will be described with reference to FIGS. 4 to 7.

Figure 4:
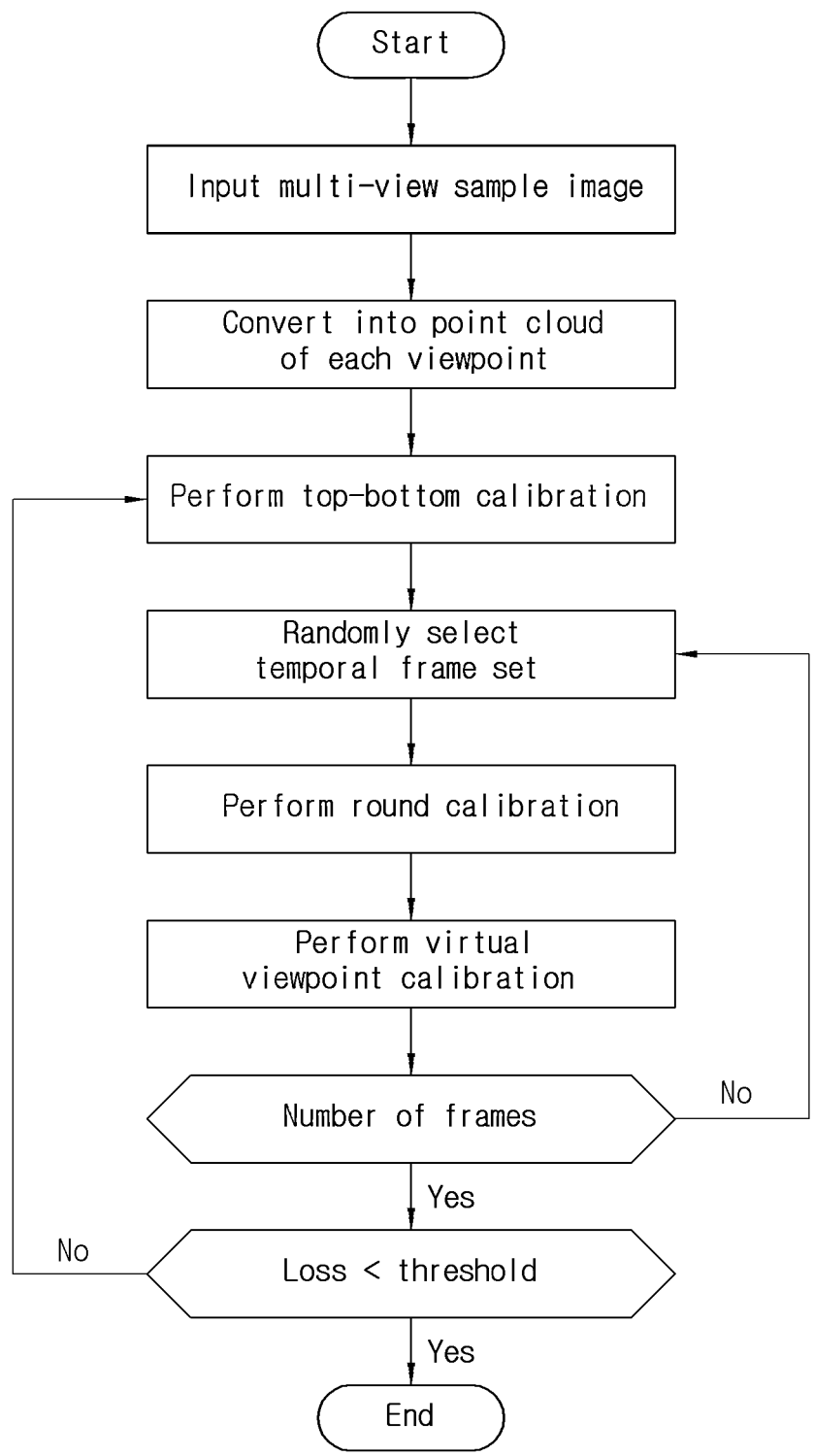
FIG. 4 is a flowchart illustrating a multi-view camera-based iterative calibration method for generating a 3D volumetric model according to an embodiment of the present invention.

As shown in FIG. 4, first, in operation S10, a multi-view sample image is input from a multi-view color-depth (RGB-D) camera.

The sample image, which is a color and depth image captured through the RGB-D camera 21, includes 2D pixels, each of which has a color value and a depth value. That is, a pixel of a color image has a color value, and a pixel of a depth image has a depth value.

The sample image is an image for obtaining external parameters of multi-view cameras, that is, an image for camera calibration. In other words, the method of the present invention obtains matching points shared between distributed network cameras (multi-view RGB-D cameras), and obtains a coordinate system transformation parameter for point cloud matching by using them. To this end, a sample image capable of making the matching point easier is used.

In particular, the multi-view sample image includes color-depth images of each viewpoint captured by at least four color-depth cameras constituting at least two horizontal layers. In addition, the number of viewpoints of each layer is the same, and the viewpoints of each layer in the vertical direction have similar viewpoints in the horizontal direction.

Preferably, the sample image uses a charcoal board. In the present invention, a charcoal board is used for fast operation, but it is not necessary to use a charcoal board. Because it is only necessary to find the same coordinates that allow images to match, another method of extracting feature points may be applied.

That is, the charcoal board made by combining a QR code and a chess board is used to find matching points. By setting the coordinate system of the charcoal board as the world coordinate system, the external parameters of the camera are obtained, and the point clouds are matched using feature point matching.

Figure 5A:
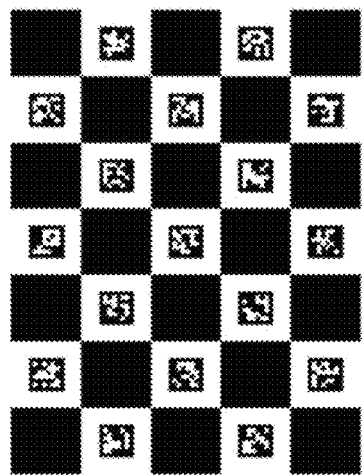
Figure 5B:
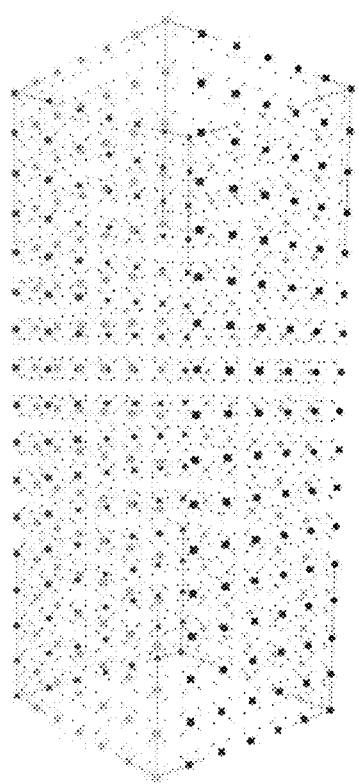
Figure 5C:
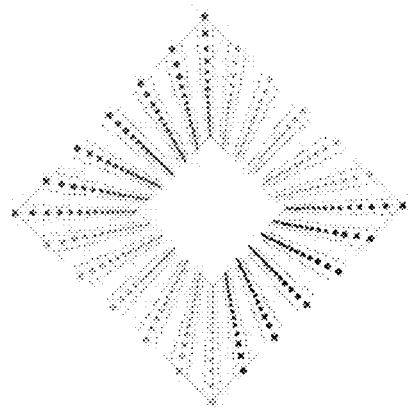

FIG. 5A shows the shape of a charcoal board to be used, and FIGS. 5B and 5C show the actual coordinates of a feature point of the charcoal board. Using these coordinates, a quantitative evaluation of the matched results may be performed.

Next, in operation S20, the sample image of each viewpoint is converted into a point cloud.

That is, the color-depth (RGB-D) image of each viewpoint at which the sample image is captured is converted into a point cloud (hereinafter, referred to as a point cloud of each viewpoint).

In this case, depth information for obtaining a high-quality external parameter may be improved. This result affects the quality of subsequent external parameters.

Next, operations S30 to S80, which will be described below, illustrate an iterative calibration process.

In iterative calibration, optimization is performed to find a parameter so that the matching error between viewpoints is minimized. Through this process, external parameters for aligning each camera coordinate system into a common world coordinate system are obtained. That is, one reference camera is selected from the distributed cameras, and the remaining cameras are matched with the coordinate system of the reference camera. Matched coordinate systems are expressed based on the world coordinate system. In addition, the coordinate transformation parameter for each camera is calculated using an optimization function.

First, the transformation parameters for the camera pair located below and above are obtained. Next, the transformation parameters for cameras located at each viewpoint are obtained. In this case, a virtual viewpoint is introduced to minimize the transformation error that occurs between the cameras.

In summary, the transformation parameters for two pairs of cameras among all cameras are sequentially obtained, and then, it is repeated to minimize the transformation error due to these transformation parameters.

First, before describing that the processes of optimizing each pair are sequentially performed, a process of optimizing parameters for two pairs of cameras will be described. The parameter optimization process is a process applied to all operations S30, S40 and S60 to be described below.

After obtaining the world coordinate system, it is required to obtain a transformation matrix from the camera coordinate system to the world coordinate system. A transformation equation from world coordinates to camera coordinates is expressed as following Equation 4, where $P_W$ represents world coordinates and $P_C$ represents camera coordinates. R and t are the transformation matrices from the camera coordinate system to the world coordinate system. Because the coordinate axis transformation and the coordinate transformation have an inverse transformation relationship, the coordinate transformation is expressed as Equation 4.

$$P_C = R \times P_W + t \qquad \text{[Equation 4]}$$

The same world coordinate system may be calculated by shooting the plane of the same charcoal board by different cameras. When two cameras share the same world coordinate system, the transformation relationship between the two camera coordinate systems is derived.

Assuming that the reference camera coordinate is PC1 and the camera coordinate to be converted is PC2, the relationship between $P_{C1}$ and $P_{C2}$ sharing $P_W$ is defined as Equation 5.

$$P_{C1} = (R_1 \times R_2^{-1}) \times P_{C2} + (-R_1 \times R_2^{-1} \times t_2 + t_1) = \qquad \text{[Equation 5]}$$
$$R_{2 \to 1} \times P_{C2} + t_{2 \to 1}$$

Where $R_1 \times R_2^{-1}$ is the rotation matrix ($R_{2 \to 1}$) from $P_{C1}$ to $P_{C2}$, and $-R_1 \times R_2^{-1} \times t_2 + t_1$ is the translation matrix ($t_{2 \to 1}$) from $P_{C1}$ to $P_{C2}$.

First, in operation S20, when each point is converted to the same coordinate system (e.g., the world coordinate system or the reference coordinate system) with respect to the converted point cloud of each camera (each viewpoint), the 3D coordinates of each point may be matched. A coordinate transformation parameter that allows the matched coordinates to be located at the same location is estimated.

In particular, after creating an error function between parameters by using an optimization algorithm, a solution of the error function is obtained by using a gradient descent scheme.

Preferably, the coordinate system transformation matrix includes a total of 7 parameters including rotation angles, translation values, and scaling factors of each of the x, y and z axes. In particular, because a depth value that is different from the photographed actual distance may be output due to a noise component generated in the depth image and a camera manufacturing error, a scaling factor is newly introduced as a parameter to compensate for it.

A parameter that converts the coordinate system of the viewpoint to be obtained from the reference camera coordinate system is obtained. This process is defined as Equation 6.

$$X_i' = R_{i \to ref} S_{i \to ref} X_i + t_{i \to ref}$$ [Equation 6]

Where $X_{ref}$ is the coordinate system of the reference camera, and $X_i$ is the coordinate system of the camera to be estimated. $R_{i \to ref}$, $t_{i \to ref}$, $R_{i \to ref}$, $t_{i \to ref}$ and $S_{i \to ref}$ are the rotation transformation matrix, translation matrix and scaling factor for the reference camera coordinate system, respectively. Initially, $R_{i \to ref}$ is set as a unit matrix, and $S_{i \to ref}$ and $t_{i \to ref}$ are set to '1' and '0', respectively.

The error function $f_{Error}$ is an average value of the squared Euclidean distance (SED) of $X_{ref}$ and $X_i'$ and is defined as in Equation 7.

$$f_{Error} = \frac{1}{N} \sum_{j=0}^{N} \|X_{ref}(j) - X_i'(j)\|_2^2$$ [Equation 7]

Where N represents the total number of matched point clouds.

When $X_i'(j)$ approaches $X_{ref}(j)$ in Equation 7, $f_{Error}$ converges to zero. That is, it means that optimal $R_{i \to ref}$, $t_{i \to ref}$ and $S_{i \to ref}$ for converting $X_i(j)$ to $X_{ref}(j)$ were estimated.

After the function is differentiated for all coordinate system transformation parameters, a process of updating a parameter so that the error function value is minimized is defined as Equation 8.

$$P_{n+1} = P_n - \alpha \frac{\partial f_{cost}}{\partial P_n}$$ [Equation 8]

Equation 8 illustrates a process of updating $P_{n+1}$ by using the n-th parameter Pn and the partial derivative result of $f_{Error}$, in which α is a constant representing the learning rate, P means the coordinate transformation parameters R, t and S, $\partial f_{Error}/\partial P_n$ means partial differentiation of Equation 7 with a coordinate transformation parameter. Equation 7 contains terms related to Equation 6, and since R, t and S denote P values, partial differentiation is possible.

Because the error of the currently transformed coordinates can be obtained through Equation 7, the parameter is updated such that the error is reduced using Equation 8. The determination that the $f_{Error}$ is minimized is determined by the amount of change because the accuracy of the position on the 3D coordinate is all different due to the noise of the depth image. Iterative calculation is performed and terminated when the change amount value $\alpha(\partial f_{Error}/\partial P_n)$ is less than a predetermined threshold value.

Hereinafter, operations S30 to S80, which are an iterative calibration process, will be described in detail.

First, top-bottom calibration (or top-bottom matching) is performed (S30). That is, at each viewpoint in the horizontal direction, the transformation parameter (or external parameter or camera parameter) is optimized by performing calibration on the cameras in the vertical direction. That is, optimization is performed by calibrating the point clouds of the viewpoints adjacent in the vertical direction.

It may not be relatively difficult to calibrate two cameras located above and below at a similar viewpoint. However, it is difficult to ignore the error of the color-depth (RGB-D) sensor.

In the previous example, because two cameras (top and bottom) are arranged in the vertical direction at each of the four viewpoints (viewpoints in the horizontal direction), four top-bottom calibrations are performed. In the calibration process, the parameter optimization scheme described above is used, and optimization is performed using Equation 7 defined above.

Figure 6:
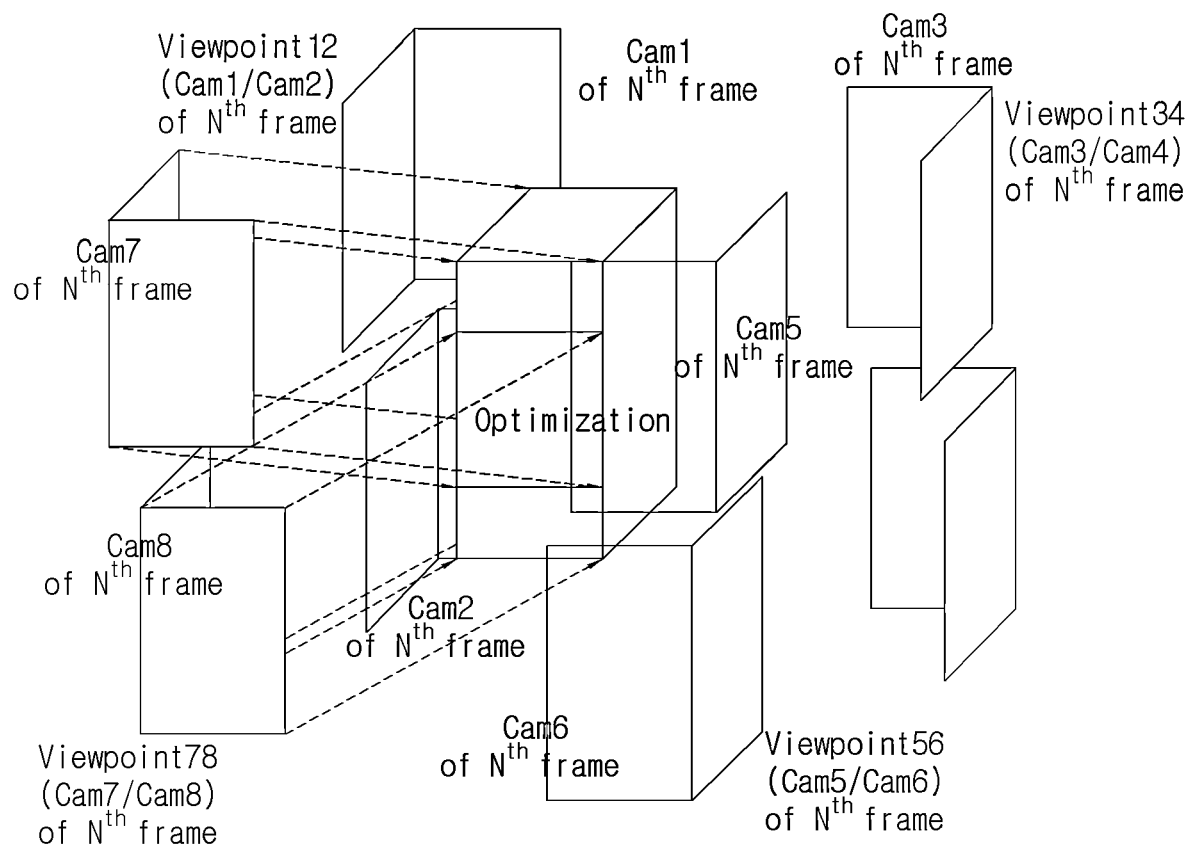
FIG. 6 is a view illustrating a top-bottom calibration method according to an embodiment of the present invention.

The top-bottom calibration scheme is shown in FIG. 6. In the example of FIG. 6, a transform coordinate system (or transform parameter) between two cameras positioned above and below is obtained through the optimization process between images captured by two cameras positioned at similar viewpoints.

FIG. 6 illustrates a total of eight images captured at four viewpoints, where an optimization process between images obtained through cameras 7 and 8 among them at the position of viewpoint 78 is illustrated.

In addition, after optimization, the matched point cloud is extracted. That is, in the above example, after performing the top-bottom calibration for a plurality of frames at each viewpoint, one result for each viewpoint is selected from among them, and four pairs of top-bottom matched point cloud sets are prepared.

Meanwhile, top-bottom calibration is performed on consecutive frames of an RGB-D image.

Next, in operation S40, top-bottom matched point clouds of each viewpoint are extracted, but randomly extracted from a plurality of frames of the corresponding view. That is, one set is randomly extracted from the top-bottom matched point clouds of consecutive frames at each viewpoint, and is extracted as a top-bottom matched point cloud at the corresponding viewpoint.

Figure 7:
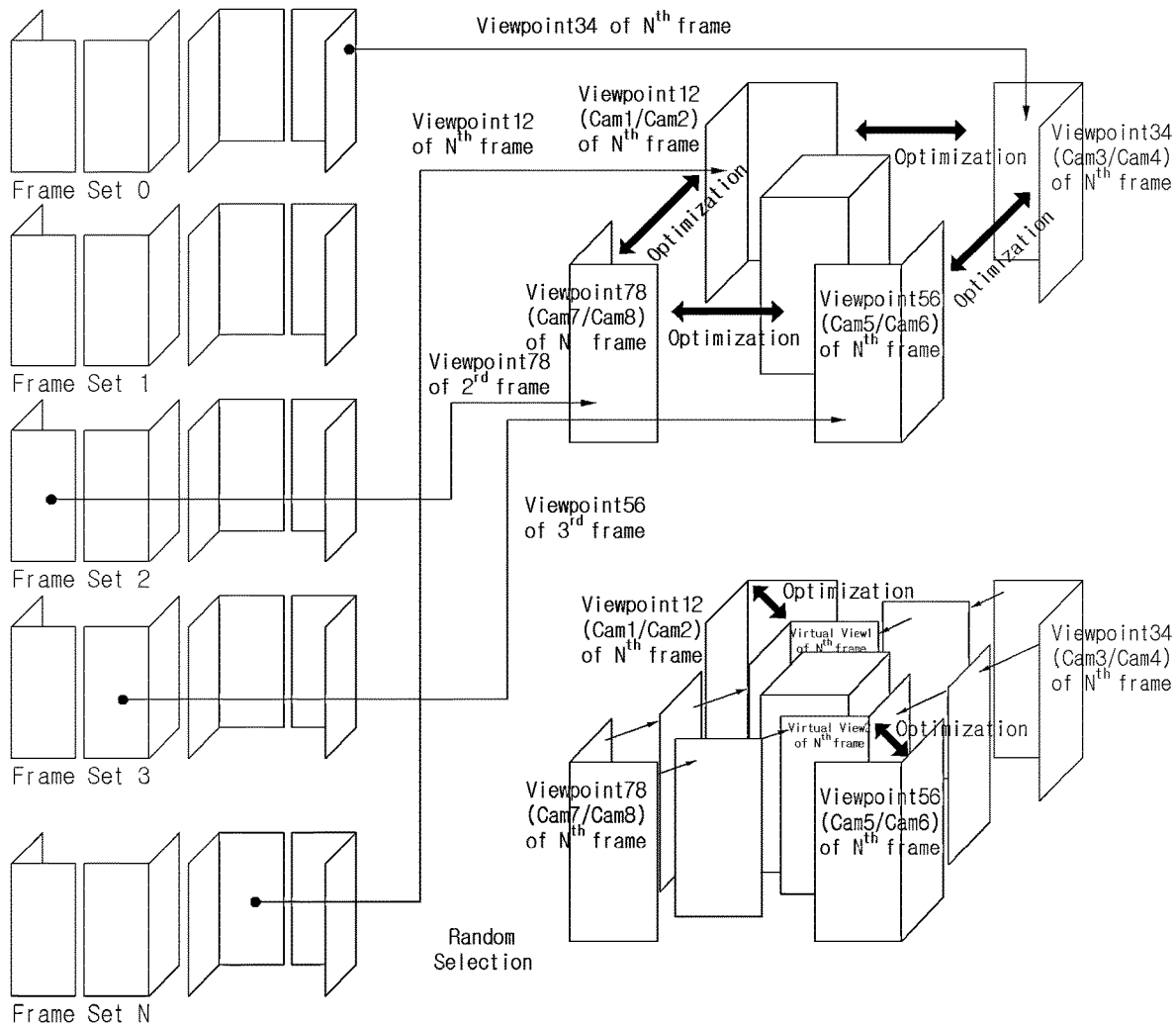
FIG. 7 is a view illustrating a temporary round calibration method according to an embodiment of the present invention, and is an exemplary diagram in which optimization using a virtual viewpoint is performed after optimizing between viewpoints.

As shown in FIG. 7, one top-Bottom calibration parameter is selected for each viewpoint from N frame sets.

In operation S70, the following round calibration and virtual view calibration processes are repeatedly performed on a set randomly selected from a plurality of frames. If a set randomly selected from the plurality of frames is not used, the camera parameters may repeat similar values without converging to the minimum value.

Preferably, a set selected once in a plurality of frames is excluded so as not to be selected redundantly.

Next, in operation S50, round calibration is performed with respect to the top-bottom matched point clouds of each viewpoint adjacent in the horizontal direction. That is, for each pair of two adjacent top-bottom matched point clouds, calibration is performed through the parameter optimization process described above to optimize the transformation parameter.

Through the round calibration, the parameters for four pairs are optimized as parameters for aligning to a unified coordinate system with respect to one world coordinate system. That is, when a top-Bottom calibration extrinsic parameter is given as an input, extrinsic optimization is performed between viewpoints adjacent to each other.

In the example of FIG. 6 above, the point clouds matched in the top-bottom calibration will be referred to as point clouds 12, 34, 56, and 78, respectively.

FIG. 7 schematically illustrates a round calibration process. In operation S40 above, one top-Bottom calibration parameter was selected for each viewpoint in N frame sets.

At viewpoint 12 (front), calibration is performed separately from viewpoint 34 (left) and viewpoint 78 (right), and then, at viewpoint 56 (Rear), calibration is performed separately from viewpoint 34 and viewpoint 78, respectively. That is, the calibration is performed in pairs of viewpoint 12 and viewpoint 78, viewpoint 12 and viewpoint 34, viewpoint 78 and viewpoint 56, and viewpoint 56 and viewpoint 34, respectively.

Next, in operation S60, optimization is performed again by using a virtual viewpoint. That is, at each viewpoint in the horizontal direction, a point cloud of a virtual viewpoint is created by summing some point clouds of two viewpoints on both sides adjacent to the corresponding viewpoint, and parameter optimization is performed on the point clouds of the virtual viewpoint and the corresponding viewpoint.

In particular, point clouds that can be matched with the corresponding viewpoint are combined among the point clouds of two viewpoints on both sides of the viewpoint. In addition, the point clouds of both viewpoints merged into the point cloud of the virtual viewpoint target the point clouds matched in the round calibration operation above.

Two virtual viewpoints corresponding to viewpoint 12 and viewpoint 56 are created by combining some information of viewpoint 34 and viewpoint 78. The virtual viewpoint performs optimization with the actual viewpoint 12 and viewpoint 56.

Such a scheme using a virtual viewpoint enables simultaneous calibration for multiple viewpoints by subdividing the viewpoint in the calibration between two adjacent viewpoints.

The two virtual viewpoints are virtual viewpoint 1 and virtual viewpoint 2. As identified in FIG. 6, when using virtual viewpoint 1, it is possible to obtain the effect of simultaneously optimizing three viewpoints (viewpoint 34, viewpoint 78, viewpoint 12), and even when using virtual viewpoint 2, the same effect is obtained. That is, the virtual viewpoint may have the effect of including all viewpoints in the optimization function at once.

Next, in operation S80, the entire extrinsic calibration process is terminated by evaluating the magnitude of the error and the amount of change in the optimization function of all calibrations.

Preferably, all errors are within a predetermined range, and even if it is additionally repeated a predetermined number of times, when the amount of change in which the error decreases is smaller than the predetermined threshold amount of change, the process is terminated. For example, at the time point of repetition of 20,000 times, even if it repeats the last 3000 times, when the amount of change of all the errors that decrease at this time is less than a predetermined threshold value, the process is terminated.

Although the present invention made by the present inventor has been described in detail according to the above embodiments, the present invention is not limited to the above embodiments, and can be changed in various manners without departing from the scope of the present invention.

What is claimed is:

1. A multi-view camera-based iterative calibration method for generation of a 3D volumetric model, the multi-view camera-based iterative calibration method comprising:
   (a) receiving one or more multi-view color-depth images;
   (b) performing a point cloud of each viewpoint by converting each multi-view color-depth image into the point cloud;
   (c) performing top-bottom calibration by optimizing a transformation parameter by calibrating top-bottom point clouds which are point clouds of viewpoints adjacent in a vertical direction, and matching the top-bottom point clouds;
   (d) performing round calibration by optimizing the transformation parameter by calibrating top-bottom matched point clouds of viewpoints adjacent in a horizontal direction; and
   (e) performing viewpoint calibration by generating a point cloud of a virtual viewpoint by combining some of the top-bottom point clouds of at least two viewpoints, and optimizing the transformation parameter by calibrating a viewpoint adjacent to the virtual viewpoint.

2. The multi-view camera-based iterative calibration method of claim 1, wherein, in (a), the multi-view color-depth images include color-depth images of each viewpoint captured by at least four color-depth cameras constituting at least two horizontal layers, and numbers of the multi-view color-depth images in each layer are same.

3. The multi-view camera-based iterative calibration method of claim 1, wherein, in (c), the transformation parameter is optimized by calibrating point clouds of viewpoints adjacent in the vertical direction at each of all viewpoints in the horizontal direction, and a top-bottom matched point cloud is generated by matching and combining point clouds of viewpoints adjacent in the vertical direction with a coordinate system of one viewpoint among the viewpoints adjacent in the vertical direction.

4. The multi-view camera-based iterative calibration method of claim 1, wherein, in (e), the point cloud of the virtual viewpoint is generated by combining some of top-bottom point clouds of two adjacent viewpoints of a corresponding viewpoint at each viewpoint in the horizontal direction when performing the virtual viewpoint calibration, and calibration is performed on each of the point cloud of the virtual viewpoint and the top-bottom point clouds of the two adjacent viewpoints of the virtual viewpoint.

5. The multi-view camera-based iterative calibration method of claim 1, wherein, in (d), the top-bottom matched point clouds used for the round calibration are randomly extracted from a plurality of frames, and one of the top-bottom matched point clouds of consecutive frames of the respective multi-view color-depth images at each viewpoint is randomly extracted as a top-bottom matched point cloud of the corresponding viewpoint.

6. The multi-view camera-based iterative calibration method of claim 5, further comprising:
   (f) repeating (d) and (e) on the top-bottom matched point cloud of one of the randomly selected plurality of frames.

7. The multi-view camera-based iterative calibration method of claim 1, wherein, in (c), (d) and (e), when performing the top-bottom calibration, the round calibration, and the virtual viewpoint calibration, respectively, one of the two viewpoints is set as a reference coordinate system, and the transformation parameter includes a rotation transformation matrix, a translation matrix, and a scaling factor for the reference coordinate system.

8. The multi-view camera-based iterative calibration method of claim 1, wherein, when performing the top-bottom calibration, the round calibration, and the virtual viewpoint calibration, the transformation parameter is optimized to minimize an error between an actual coordinate ($X_{ref}$) of a point cloud of a reference coordinate system and a transformation coordinate ($X_i'$) by the transformation parameter.

9. The multi-view camera-based iterative calibration method of claim 8, further comprising:
   (g) repeating (c), (d), and (d), and ending the repeating by evaluating an error degree and variation of an optimization function of all of the top-bottom calibration, the round calibration, and the virtual viewpoint calibration.

10. The multi-view camera-based iterative calibration method of claim 9, wherein, in (g), when an error of the optimization function of all of the top-bottom calibration, the round calibration, and the virtual viewpoint calibration is within a predetermined range, and the variation leading to reduction of the error of the optimization function is less than a predetermined threshold variation when the repeating is additionally performed by a predetermined number of times, the ending is performed.

11. The multi-view camera-based iterative calibration method of claim 8, wherein, when performing the top-bottom calibration, the round calibration, and the virtual viewpoint calibration, the optimizing of the transformation parameter is repeated by updating a next coordinate transformation parameter $P_{n+1}$ from a current coordinate transformation parameter $P_n$ according to Equation 1, $$P_{n+1} = P_n - \alpha \frac{\partial f_{Error}}{\partial P_n} \quad \text{[Equation 1]}$$

wherein $\alpha$ is a preset constant, P represents a rotation transformation matrix R, a translation matrix t, and a scaling factor S of the transformation parameter, $P_n$ represents a value of the current coordinate transformation parameter, $P_{n+1}$ represents a value of the next coordinate transformation parameter to be corrected, $\partial f_{Error}/\partial P_n$ represents partial differentiation of $f_{Error}$ by the transformation parameter, and fErrer is an error function between the actual coordinates ($X_{ref}$) of the point cloud of the reference coordinate system and the transformation coordinate ($X_i'$) by the transformation parameter.

12. A non-transitory computer-readable recording medium having a program recorded thereon to perform the multi-view camera-based iterative calibration method for generation of the 3D volumetric model according to claim 1.

* * * * *